July 28, 1942.                W. F. MESINGER                2,290,915
                                GAS GENERATION
                              Filed Feb. 21, 1935                2 Sheets—Sheet 2
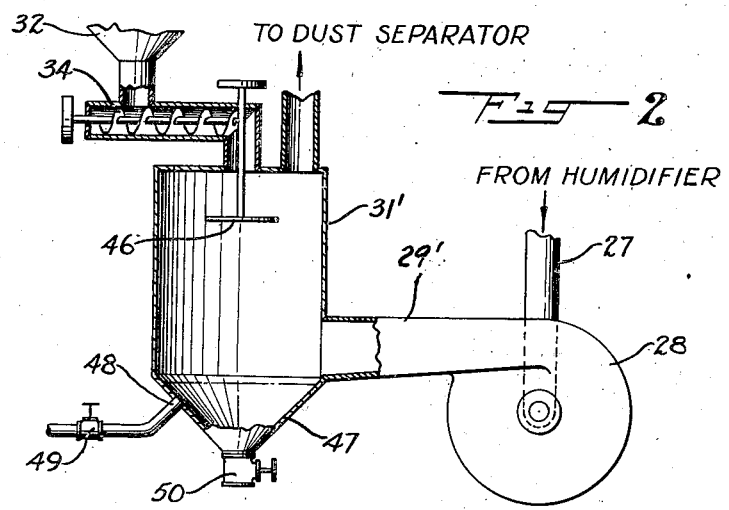
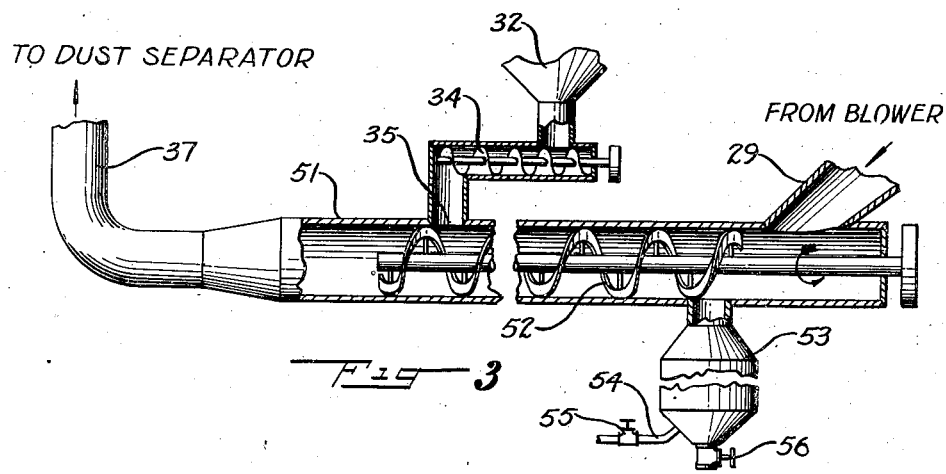
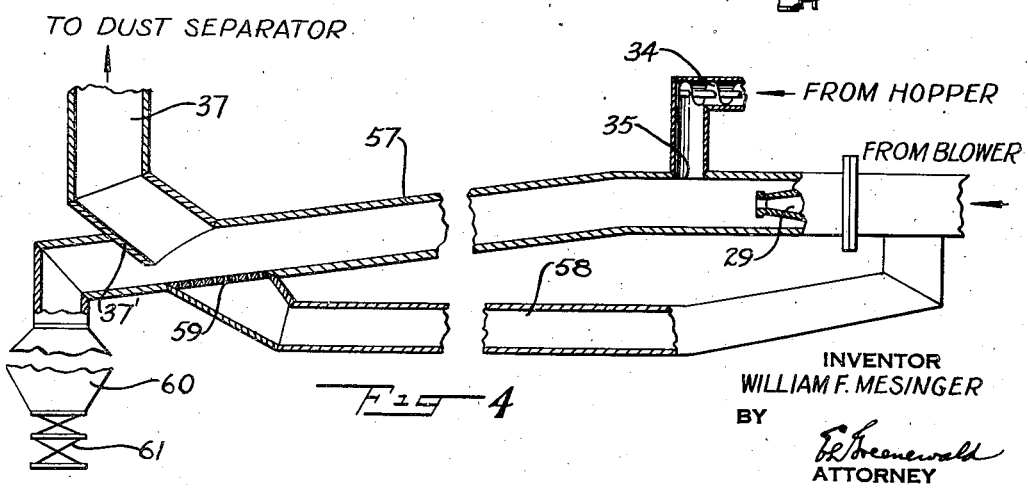
INVENTOR
WILLIAM F. MESINGER
BY
ATTORNEY Patented July 28, 1942

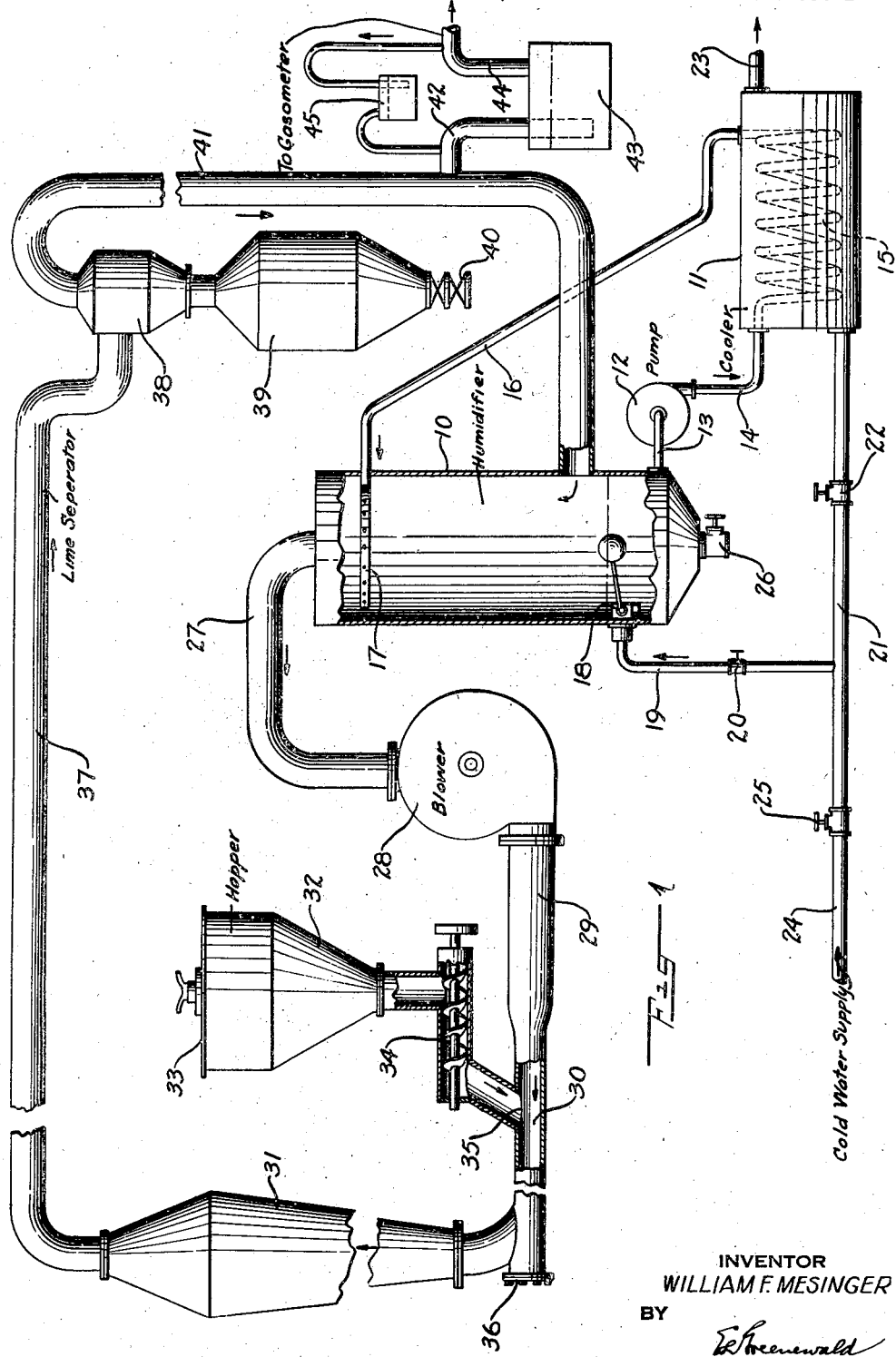

2,290,915

UNITED STATES PATENT OFFICE 2,290,915

GAS GENERATION

William F. Mesinger, Flushing, N. Y., assignor, by mesne assignments, to The Prest-O-Lite Company, Inc., a corporation of New York Application February 21, 1935, Serial No. 7,532

15 Claims. (Cl. 48—38)

This invention relates to gas generation, having special reference to a novel process and apparatus for the generation of a gas by the reaction of a solid and a fluid.

More specifically, the invention is concerned with a system of gas generation by the reaction of a solid and a fluid wherein there results a solid reaction product which it may be desirable to recover. Such a system is exemplified in the generation of acetylene by the reaction of calcium carbide and water, leaving calcium hydrate as the reaction product, and while in the following specification the invention will be described chiefly with reference to this preferred embodiment, it is not to be construed as limited thereto except as indicated in the appended claims.

Acetylene has for some time been produced by dropping calcium carbide into a large excess of water. This is objectionable because the residue exists in the form of a lime sludge which is cumbersome to handle and dispose of, and from which the calcium hydroxide can be recovered only with considerable difficulty and expense.

Recent processes have been developed wherein the calcium carbide is treated with such a limited quantity of water that the carbide is completely reacted and the exothermic heat of reaction is dissipated by the evaporation of excess water, so that the calcium hydrate produced is immediately discharged in a substantially dry state, and thus forms a valuable by-product. The acetylene generated, however, then contains mixed with it that quantity of water vapor which necessarily evaporates for cooling purposes, which is an objectionable feature of such a process. Furthermore, it is difficult in such a process from a practical standpoint to maintain the temperature throughout the generator at a uniformly low and safe value, since if a minimum quantity of water is added it is difficult to obtain proper distribution and local over-heating may result, while if a larger quantity of water is added to prevent such local over-heating, the calcium hydrate residue may not be discharged in a substantially dry state.

A process wherein calcium carbide and water are reacted to produce simultaneously acetylene and substantially dry calcium hydrate is commonly known as dry generation of acetylene.

Generally, the object of the present invention is to provide a novel process for the dry generation of acetylene which shall be simple, safe, economical, and effective.

More specifically, objects of this invention are to provide a process of the character indicated which shall continuously and completely react calcium carbide to result in the continuous and simultaneous production of acetylene and substantially dry calcium hydrate or calcium oxide; which shall be capable of accurate temperature control to operate within any desired temperature throughout, so that explosion hazards and objectionable polymerization of the gaseous products are minimized; which shall result in acetylene gas substantially free from water vapor; which shall be equally effective for lump, dust, pulverized, or run-of-crusher carbide; and which shall effectively separate and dispose of any impurities which may be present in the calcium carbide.

A further object of this invention is to provide novel arrangements of apparatus for carrying out the new process as will hereinafter more fully appear.

These and other objects of this invention and the novel features thereof which achieve these objects will become evident from the following detailed description, having reference to the accompanying drawings, in which:

Fig. 1 is a diagrammatic view of an arrangement of apparatus embodying the principles of this invention and adapted especially for the reaction of calcium carbide in lump or run-of-crusher form;

Fig. 2 is a diagrammatic fragmentary view of a similar arrangement of apparatus adapted especially for the reaction of calcium carbide in dust or pulverized form; and Figs. 3 and 4 are fragmentary views of parts of similar arrangements of apparatus more particularly adapted for the reaction of relatively impure calcium carbide especially in lump or run-of-crusher form, having special means for continuously removing lumps of heavy impurities.

Throughout the following specification and claims, the term "fluid" will be considered to mean a liquid, a vapor or gas, or a mixture of a liquid and a vapor or gas. Similarly, the term "water" will be considered to mean water in the liquid phase, water in the vapor phase, or a mixture of water in both phases. Thus water-laden acetylene will be understood to be acetylene containing entrained water in the form of droplets or mist, acetylene containing water vapor, or acetylene containing both water vapor and entrained water (usually and preferably acetylene saturated or supersaturated with water vapor and containing some entrained water).

In broad principle, the present invention provides a process and means for generating a gas by the reaction of a solid and a fluid wherein the solid is contacted with a gas laden with the reacting fluid. It will be obvious that the gas employed should be inert with respect to the gas being generated in order that the generated gas will not be destroyed. The fluid may be held in the gas either as a vapor or as entrained liquid in the form of a fog or mist. The gas then acts as a vehicle for bringing the fluid into intimate contact with the solid. The gas may be a different gas but is preferably the same gas as the gas generated so that no subsequent separation of the gases is necessary and so that there may be a continuous recirculation of the generated gas, only such an amount as is freshly generated in any cycle being drawn off to a gas holder or point of consumption. If the reaction between the solid and the fluid is exothermic, the heat of reaction may conveniently be removed through the agency of the gas; if the fluid in the gas is entirely in the vapor phase, the heat of reaction may be dissipated by the heat capacity of the gas and vapor, while if the fluid in the gas is partly in the liquid phase, the heat of reaction may be dissipated both by the heat capacity of the gas and vapor and by the heat of vaporization of the liquid. Of course, some of the exothermic heat of reaction may be removed by the heat capacity of the reacting solid and through the walls of the apparatus. Also, all the products of reaction, whether gaseous, liquid, or solid, may be removed through the agency of the gas. Any commercially valuable by-products may be readily separated from the gas stream and recovered. The invention thus provides a novel process by which a gas may be continuously generated by the reaction of a solid and a fluid and in which the gas may act as a vehicle for bringing the fluid into contact with the solid, for removing the exothermic heat of reaction, if any, and for removing the products of reaction.

Applying these principles to the dry generation of acetylene, this invention provides a process and means for generating acetylene by contacting calcium carbide with a stream of water-laden acetylene. Acetylene from any source, but preferably tapped directly from the generating system itself, is cooled and caused to pick up water, and is then contacted with calcium carbide in a preferably rapidly moving and turbulent blast, so that the water in the acetylene reacts the calcium carbide and leaves substantially dry powdered calcium hydrate, which is carried along in the gas stream and may be subsequently separated therefrom. The water added to the acetylene is preferably both vapor and liquid; that is, the acetylene is preferably saturated or supersaturated with water vapor and contains, in addition, some entrained liquid in the form of a fog or mist. The exothermic heat of reaction is removed entirely by the stream of cooled and water-laden acetylene gas, except for a relatively small amount which is removed by the heat capacity of the calcium carbide and through the walls of the apparatus; if the acetylene contains water vapor only, then the heat of reaction is dissipated by the sensible heat capacity of the gas and vapor, while if the acetylene also contains some entrained liquid, as is preferably the case, then some of the heat of reaction is dissipated by the latent heat of vaporization of this liquid. The acetylene gas is subsequently again cooled in any suitable manner, but preferably by water sprays, so that water addition and cooling take place simultaneously.

There is preferably a continuous recirculation of acetylene, only such a quantity of acetylene as is freshly generated in any cycle being discharged to a gas holder or point of consumption. Since the water added to the recirculated acetylene is utilized in reacting the calcium carbide, the acetylene discharged is substantially dry, containing no appreciable amount of water vapor. The pressure of the process may be maintained at any desired value by regulating the acetylene discharge pressure. By varying the volume of recirculated acetylene relatively to the quantity of carbide reacted, or by varying the temperature to which the recirculated acetylene is cooled, or by varying the amount of entrained water fogged into the acetylene, the temperature of the process may be maintained within any desired limit, so that explosion hazards and objectionable polymerization are minimized. Ordinarily, the reaction products will be acetylene and substantially dry calcium hydrate ($Ca(OH)_2$). However, if the temperature is maintained above about 400° C. over at least a portion of the reaction zone and if the partial pressure of water vapor is maintained below about 0.1 atmosphere over at least a portion of the reaction zone, it is possible to regulate the process to produce acetylene and calcium oxide as the reaction products. The invention then provides a novel and safe process and means for the continuous and simultaneous production of acetylene and substantially dry calcium hydrate or calcium oxide by continuously contacting calcium carbide with a stream of cooled and water-laden acetylene or a gas inert with respect to acetylene. The acetylene acts as an agent for bringing water into contact with calcium carbide, for removing at least a substantial part of the exothermic heat of reaction, and for removing the substantially dry products of reaction.

In Fig. 1 is shown a preferred embodiment of the present invention adapted especially for the reaction of calcium carbide in lump or run-of-crusher form. Dry recirculated acetylene enters a gas cooler and humidifier 10, where it is preferably sprayed countercurrently with water which has been cooled to the desired temperature in a water cooler 11. The water in the humidifier 10 is recirculated by a pump 12 which withdraws water from the humidifier through a conduit 13, passes it through a conduit 14 into and through a cooling coil 15 in the cooler 11, and reintroduces it into the humidifier through a conduit 16 preferably in the form of a fine spray from a sprinkler 17 or similar diffusing device. There is then produced an intimate turbulent intermixing of the acetylene and cooled water droplets, so that the acetylene is rapidly saturated or supersaturated with water vapor and preferably picks up some entrained water as a fog or mist and is rapidly cooled to the desired temperature. The temperature to which the acetyene is cooled may be readily controlled by controlling the temperature and rate of circulation of the water recirculated through the humidifier. The water in the humidifier 10 may be kept at the desired level by a float valve 18 which permits make-up water to enter the humidifier through a conduit 19 and a control valve 20 from any convenient pressure source to replace the water carried away by the acetylene and used for reacting calcium carbide. The cooling medium for the water cooler 11 may be any suitable liquid, but preferably is water from the same pressure source that supplies the make-up water, entering the water cooler through a conduit 21 and a control valve 22 and discharging therefrom through a conduit 23. The make-up and cooling water supply lines 19 and 21 respectively may both come from a main supply line 24, which may conveniently be provided with a control valve 25. The humidifier 10 may desirably be provided with a drain valve 26 for cleaning purposes.

The cooled and water-laden acetylene is withdrawn from the humidifier 10 through a conduit 27 and is discharged by a blower 28 or other suitable device through a nozzle or reducer 29 and a conduit 30 into a reaction chamber 31. Lump or run-of-crusher carbide is fed from a hopper 32, having a cover 33, by means of a rotating screw conveyer 34 or other suitable feeding device into the rapidly moving stream of cooled and water-laden acetylene at 35. The gas stream, which has acquired increased velocity in discharging from the nozzle 29, picks up at least the dust carbide and smaller particles of carbide and carries them into the reaction chamber 31. The larger lumps of carbide are rolled along the conduit 30, and are thus agitated or stirred and broken up by the gas stream and reacted by the water in the acetylene until they are small enough to be carried by the gas stream into the reaction chamber 31. The conduit 30 is of sufficient length to prevent piling up of the heavier lumps of carbide before they are sufficiently reacted to be picked up by the gas stream and carried into the reaction chamber. The conduit 30 thus acts as an auxiliary reaction chamber, and may also serve to catch any lumps of heavy impurities, which may be periodically removed through an opening in the end of the conduit 30 normally closed by a removable cover plate 36.

The reaction chamber 31 is preferably gradually flared upward so that there is a gradual decrease in the velocity of the gas stream. The heavier particles of carbide then float in the gas stream at or near where it enters the reaction chamber while the lighter particles and dust are distributed farther up the chamber and float at a point where they are just carried by the gas stream. The moisture in the acetylene reacts the carbide, producing more acetylene and powdered calcium hydrate (or calcium oxide, depending chiefly on the temperature of operation), which is so light that it readily discharges with the gas stream from the reaction chamber 31. The water originally carried by the acetylene is preferably just sufficient to completely react all the carbide, so that both the acetylene and the calcium hydrate discharged from the reaction chamber are substantially dry. If the water added to the acetylene in the humidifier 10 is insufficient to completely react all the carbide fed into the gas stream at any given rate of carbide feed and gas flow, more water may be sprayed into the gas stream at any convenient point along its flow; for example, additional water may be sprayed into the conduit 30 or the reaction chamber 31.

The gas stream, which has been dried by the reaction with calcium carbide and heated by the exothermic heat of reaction and which now carries powdered calcium hydrate as the solid product of reaction, discharges from the reaction chamber 31 through a conduit 37 to a suitable dust separator 38. The separator 38 is preferably of the centrifugal or cyclone type, adapted to separately remove the powdered calcium hydrate and any small particles of heavy impurities which may exist in the gas stream. The powdered calcium hydrate may be collected in a hopper 39 and periodically removed therefrom preferably through a double valve 40 for subsequent use. From the separator 38 the substantially dry acetylene gas, freed from solid material, passes through a conduit 41 to the gas cooler and humidifier 10, where the acetylene is again cooled and treated with water to be used in a succeeding cycle.

A portion of acetylene equal to the volume of acetylene freshly generated in any cycle is continuously tapped off from the conduit 41 through a conduit 42, and passes through a scrubber or wash box 43 and a conduit 44 to a gas holder or point of consumption not shown. A vacuum relief 45 may be provided to equalize the pressure in the system when the system is shut down, and to prevent any liquid from the wash box 43 from entering the system.

In Fig. 2 is shown another embodiment of this invention adapted especially for the reaction of calcium carbide in dust or pulverized form. Only those parts of the system which differ from the system shown in Fig. 1 are shown, the operation of both systems being substantially the same in principle. Cooled and water-laden acetylene is drawn from the humidifier through the conduit 27 by the blower 28 and discharged through the nozzle 29' into the reaction chamber 31'. A converging nozzle is not used in this system since a high velocity of the gas is not necessary to hold the fine carbide dust or powder in suspension, as is the case when heavier particles or lumps are used. Dust or pulverized carbide is fed from the hopper 32 by means of the rotating screw conveyer 34 or other suitable feeding device into the reaction chamber 31', wherein it may be distributed by a suitable device, such as a rotating baffle 46. There is then produced an intimate turbulent intermixing of the carbide dust and the water-laden acetylene in the reaction chamber, whereby the carbide is reacted by the water in the acetylene, drying the acetylene and producing more acetylene and substantially dry powdered calcium hydrate (or calcium oxide, depending chiefly on the temperature of operation). If the temperature of operation is so controlled that the temperature at the lower portion of the reaction chamber 31' does not exceed the boiling point of water at the particular operating pressure, a water chamber 47 may be provided at the base of the reaction chamber 31' to react any particles of carbide which are not picked up and reacted by the gas stream and to collect any particles of heavy impurities that may be present. The water chamber 47 may be provided with a water supply line 48, controlled by a valve 49, and a drain valve 50. The acetylene gas, carrying with it the powdered calcium hydrate or calcium oxide, discharges from the reaction chamber 31' through the conduit 37 to the dust separator, where the suspended solid material is separated out, and then completes the cycle precisely as in the preceding system.

Certain grades of commercial calcium carbide are relatively impure, containing such heavy impurities as silicon carbide, ferro-silicon, and the oxides of iron and aluminum. In the reaction of such carbide especially in lump or run-of-crusher form, these impurities may appear in the reaction products in particles or lumps of such size as to be carried or moved with difficulty even by a gas stream of very high velocity.

In Figs. 3 and 4 are shown two further embodiments of the present invention adapted especially for continuously reacting relatively impure carbide in lump or run-of-crusher form and continuously removing these lumps of heavy impurities. Only those parts of the systems which differ from the system shown in Fig. 1 are shown.

In Fig. 3, cooled and water-laden acetylene from the blower enters a reaction chamber 51 through the nozzle 29. Lump or run-of-crusher carbide is fed from the hopper 32 by means of the rotating screw conveyer 34 or other suitable feeding device into the reaction chamber 51 and the rapidly moving stream of acetylene at 35. The reaction chamber 51 is provided with a ribbon screw conveyer 52 which rotates in the direction indicated by the curved arrow so as to continuously agitate or mechanically stir the carbide and move it countercurrently to the flow of the gas stream, which flows through the core of the screw in a rapidly moving and turbulent blast. The carbide is gradually reacted by the water in the acetylene, and as the particles become fine enough through agitation and reaction, they are picked up and carried forward by the gas stream. The acetylene passes out of the reaction chamber 51 through the conduit 37 to the dust separator where the calcium hydrate or calcium oxide is separated out as previously described. The system is so arranged that all of the carbide in the gas stream is completely reacted before it reaches the dust separator, producing powdered calcium hydrate or calcium oxide and leaving the acetylene substantially dry. If the carbide fed into the reaction chamber 51 contains a substantial proportion of fines, it may be desirable or necessary to interpose a vertical flared reaction chamber similar to the chamber 31 of Fig. 1 between the reaction chamber 51 and the dust separator to insure the complete reaction of all the carbide carried by the gas stream. The lumps and particles of heavy impurities are moved along the bottom of the reaction chamber 51 by the rotating screw conveyer 52 countercurrently to the flow of the gas stream until they drop into a hopper 53. If the temperature of operation is controlled so that the temperature within the hopper 53 does not exceed the boiling point of water at the particular operating pressure, the hopper 53 may contain some water conveniently supplied through a conduit 54 and a control valve 55 for completing the reaction of any lumps of only partially reacted carbide that may find their way into the hopper. However, the reaction chamber 51 is preferably of sufficient length to avoid such a contingency. A discharge valve 56 may be provided for periodically emptying the hopper 53.

In Fig. 4, cooled and water-laden acetylene from the blower enters a conduit or reaction chamber 57 through the nozzle 29. A portion of the acetylene from the blower is by-passed through a conduit 58 and enters the reaction chamber toward the lower end thereof through a grating 59 or other suitable diffusing device. Lump or run-of-crusher carbide is fed from the hopper by means of the rotating screw conveyer 34 or other suitable feeding device into the reaction chamber 57 and the rapidly moving stream of acetylene at 35. The smaller particles of carbide are picked up and the larger lumps are rolled along by the gas stream and reacted by the water in the acetylene. The reaction chamber 57 is preferably slightly inclined downward in the direction of gas flow to facilitate rolling along of the lumps of carbide and impurities. The lumps which have not been sufficiently reacted or broken up to be carried by the gas stream roll over the grating 59, where they are contacted by a fresh stream of cooled and water-laden acetylene which completes the reaction and blows away the fine calcium hydrate residue. Both streams of acetylene, carrying with them the powdered calcium hydrate residue and any lumps of unreacted carbide, discharge through the conduit 37 to the dust separator, by which time the acetylene is substantially dry and all of the carbide is completely reacted, so that the calcium hydrate or calcium oxide residue is separated out and the acetylene continues to complete the cycle as in the preceding systems. If the carbide fed into the reaction chamber contains a substantial proportion of fines, it may be necessary to add a vertical flared reaction chamber similar to the chamber 31 of Fig. 1 to the system ahead of the dust separator to insure the complete reaction of all of the carbide carried by the gas stream before it reaches the dust separator. The particles and lumps of heavy impurities continue to roll along until they drop into a hopper 60 from which they may be periodically removed through a double valve 61. This hopper, like the hopper 53 in Fig. 3, may also contain some water to complete the reaction of any partially reacted carbide which may find its way into the hopper, but the reaction chamber 57 is preferably of sufficient length to avoid such a contingency. A baffle 37' may be provided extending into the reaction chamber 57 to facilitate discharging of the suspended carbide and calcium hydrate with the gas stream from the reaction chamber to the dust separator, and prevent their escaping into the hopper 60.

It will be readily appreciated that various types and arrangements of apparatus may be substituted for those hereinbefore described for carrying out the novel process without exceeding the scope of the present invention as indicated in the appended claims. It is, for example, contemplated that calcium carbide may be fed into a reaction chamber and allowed to rest therein, while cooled and water-laden acetylene is blown through the calcium carbide by a suitable diffusing device. The velocity of the gas stream then need be no greater than that necessary to carry away the powdered calcium hydrate as the carbide is reacted by the water in the acetylene gas stream.

It will also be appreciated that the novel process of this invention is suitable for the generation of gas from solids other than calcium carbide which react with vaporized or atomized liquids to form a desired gas. For instance, many of the metal carbides (solid) react with water or dilute acids (fluid) to form one or more hydrocarbon gases and certain solid by-products of reaction. The alkali metal (sodium, potassium, rubidium, caesium, and lithium) carbides and the other alkaline earth metal (barium, magnesium, and strontium) carbides react similarly to calcium carbide with water or dilute acids to form acetylene and the hydrate, the oxide, or the salt of the metal in accordance with the following examples:

$$CaC_2 + 2H_2O \rightarrow C_2H_2 + Ca(OH)_2$$
$$CaC_2 + H_2O \rightarrow C_2H_2 + CaO$$
$$CaC_2 + 2HCl \rightarrow C_2H_2 + CaCl_2$$

Aluminum, beryllium, and manganese carbides react with water or dilute acids to form methane and the corresponding hydrate, oxide, or salt in accordance with the following examples:

$$Al_4C_3 + 12H_2O \rightarrow 3CH_4 + 4Al(OH)_3$$
$$Al_4C_3 + 6H_2O \rightarrow 3CH_4 + 2Al_2O_3$$
$$Al_4C_3 + 12HCl \rightarrow 3CH_4 + 4AlCl_3$$

Other carbides, such as lanthanum and uranium, react with water or dilute acids to form both acetylene and methane, and the corresponding hydrate, oxide, or salt. Certain metal nitrides (solid) react with water in the form of steam to form ammonia and the corresponding metal hydrate, oxide, or hydrate of the oxide in accordance with the following examples:

$$Ca_3N_2 + 6H_2O \rightarrow 2NH_3 + 3Ca(OH)_2$$
$$Mg_3N_2 + 3H_2O \rightarrow 2NH_3 + 3MgO$$
$$BN + 3H_2O \rightarrow NH_3 + H_3BO_3$$

Certain metal hydrates, such as calcium, barium, and strontium hydrate, react with carbon monoxide (usually of water gas) and water in the form of steam to form hydrogen and the corresponding metal carbonate. Here either carbon monoxide or hydrogen may be used as a vehicle for bringing water into contact with the hydrate, but hydrogen is preferably used in accordance with this invention so that there may be a continuous recirculation of the gas with the ultimate removal of all carbon monoxide and carbon dioxide present. An example of such a reaction may be formulated as:

$$Ca(OH)_2 + H_2O + 2CO \rightarrow CaCO_3 + 2H_2 + CO_2$$
$$CO_2 + Ca(OH)_2 \rightarrow CaCO_3 + H_2O$$

Some metals, such as aluminum, silicon, and iron, react directly with water in the form of steam to form hydrogen and the corresponding metal oxide in accordance with the following example:

$$2Al + 3H_2O \rightarrow 3H_2 + Al_2O_3$$

The principal features of the novel process are the reaction of a solid by a vaporized and/or atomized fluid carried by a stream of gas for generating more gas, the control of the temperature of the reaction at least to a substantial extent through the agency of the gas stream, and the removal of part or all the products of reaction, whether solid, liquid, or gaseous, from the zone of reaction through the agency of the gas stream.

What is claimed is:

1. Process for producing acetylene and a substantially dry residue which comprises contacting calcium carbide in a reaction zone with a stream of water-laden acetylene, whereby the water in said acetylene reacts said calcium carbide to produce more acetylene and a substantially dry residue; removing said residue from the reaction zone by the agency of said acetylene; and separately collecting said acetylene and said residue.

2. Process for the continuous and simultaneous production of acetylene and substantially dry calcium hydrate which comprises continuously feeding calcium carbide into a rapidly moving stream of water-laden acetylene, whereby the water in said acetylene reacts said calcium carbide to produce more acetylene and substantially dry calcium hydrate; removing said hydrate from the carbide by the agency of said stream; and removing said substantially dry calcium hydrate from said rapidly moving stream of acetylene.

3. Process for the continuous and simultaneous production of acetylene and substantially dry calcium hydrate which comprises continuously intimately contacting calcium carbide with a rapidly moving stream of cooled and water-laden acetylene, whereby the water in said acetylene reacts said calcium carbide to produce more acetylene and substantially dry calcium hydrate; removing said hydrate from the carbide by the agency of said stream; removing said substantially dry calcium hydrate from said rapidly moving stream of acetylene; collecting a portion of said acetylene; and cooling and adding water to the remaining portion of said acetylene, which cooled and water-laden portion is used to react succeeding portions of said calcium carbide.

4. Process for producing acetylene and calcium oxide which comprises contacting calcium carbide with a stream of water-laden acetylene, whereby the water in said acetylene reacts said calcium carbide to produce more acetylene; maintaining the temperature over at least a portion of the reaction zone above about 400° C.; maintaining the partial pressure of water vapor over at least a portion of the reaction zone below about 0.1 atmosphere; removing the products of reaction from the carbide through the agency of the stream of acetylene; and separately collecting the acetylene and the resulting calcium oxide.

5. Process for generating acetylene which comprises feeding particles of calcium carbide into a rapidly moving stream of water-laden acetylene, whereby the water in said acetylene reacts said calcium carbide to produce more acetylene and a substantially dry residue; moving said calcium carbide countercurrently to the flow of said stream of water-laden acetylene; agitating said particles of carbide during such countercurrent movement; and removing said products of reaction through the agency of said acetylene.

6. Apparatus for the continuous and simultaneous production of acetylene and substantially dry calcium hydrate comprising in combination a reaction chamber; means for continuously feeding calcium carbide containing heavy impurities into said reaction chamber; means for cooling and adding water to acetylene; means for producing a rapidly moving continuous stream of said cooled and water-laden acetylene through said reaction chamber, whereby the water in said acetylene reacts said calcium carbide to produce more acetylene, substantially dry calcium hydrate, and particles of heavy impurities; agitating means in said reaction chamber for causing said calcium carbide to move countercurrently to the flow of said stream of acetylene and causing the hydrate produced to be carried away from said carbide by said stream; and means for continuously removing each of the products of reaction from said reaction chamber and separately collecting the same.

7. In a process for the continuous and simultaneous production of acetylene and a substantially dry calcium hydrate, the steps comprising bringing limited quantities of water into contact with calcium carbide in a reaction zone; removing the hydrate produced from the carbide and out of the reaction zone as fast as it is formed by the agency of a rapidly moving stream of acetylene; and separating the hydrate from the acetylene.

8. Process for the continuous and simultaneous production of acetylene and substantially dry calcium hydrate which comprises causing a stream of acetylene to flow at a relatively rapid rate in a continuous circuitous path; cooling and adding water to said stream at one point of said path; feeding particles of calcium carbide at a controlled rate into such cooled and moisture-laden stream; effecting intimate contact at relatively high velocity between said particles of carbide and said stream whereby said particles are decomposed by the water to form more acetylene and a substantially dry calcium hydrate; moving said particles turbulently in the direction of flow of said stream; effecting the separation of said hydrate from said carbide particles through the agency of said stream; separating the said hydrate in a commercially dry state from said stream before again cooling the stream; and withdrawing acetylene so produced.

9. Process for the continuous and simultaneous production of acetylene and substantially dry calcium hydrate which comprises causing a stream of acetylene to flow at a relatively rapid rate in a continuous circuitous path; cooling and adding water to said stream at one point of said path; feeding particles of calcium carbide at a controlled rate into such cooled and moisture-laden stream; effecting intimate contact at relatively high velocity between said particles of carbide and said stream; maintaining said particles in such contact with the stream for a sufficient time so that the water added substantially completely decomposes said particles to form more acetylene and substantially dry calcium hydrate; effecting the separation of said hydrate from said carbide particles through the agency of said stream; separating the dry hydrate from said stream before again cooling the stream; and withdrawing from the stream acetylene so produced.

10. A process for the production of acetylene from calcium carbide which comprises adding only so much water to the calcium carbide as is necessary for the production of acetylene and a practically dry calcium hydroxide while simultaneously stirring the mixture of calcium carbide and calcium hydroxide formed during the process, and separating the calcium hydroxide from the calcium carbide by the action of a current of gas conducted therethrough with such a speed as to carry away the calcium hydroxide having been detached by the mechanical stirring.

11. A process for the production of acetylene from calcium carbide which comprises adding only so much water to the calcium carbide as is necessary for the production of the acetylene and a practically dry calcium hydroxide while simultaneously stirring the mixture of calcium carbide and calcium hydroxide formed during the process, and separating the calcium hydroxide from the calcium carbide by the action of a current of acetylene conducted therethrough with such a speed as to carry away the calcium hydroxide having been detached by the mechanical stirring.

12. A process for the production of acetylene from calcium carbide which comprises adding only so much water to the calcium carbide as is necessary for the production of acetylene and a practically dry calcium hydroxide while simultaneously stirring the mixture of calcium carbide and calcium hydroxide formed during the process, and separating the calcium hydroxide from the calcium carbide by the action of a current of gas conducted therethrough with such a speed as to carry away the calcium hydroxide having been detached by the mechanical stirring, the gas being passed in a circulating stream.

13. A process for the production of acetylene from calcium carbide which comprises adding only so much water to the calcium carbide as is necessary for the production of acetylene and a practically dry calcium hydroxide while simultaneously stirring the mixture of calcium carbide and calcium hydroxide formed during the process, and separating the calcium hydroxide from the calcium carbide by the action of a current of acetylene conducted therethrough with such a speed as to carry away the calcium hydroxide having been detached by the mechanical stirring, the acetylene being passed in a circulating stream.

14. A process for the production of acetylene from calcium carbide which comprises adding only so much water to the calcium carbide as is necessary for the production of acetylene and a practically dry calcium hydroxide while simultaneously stirring the mixture of calcium carbide and calcium hydroxide formed during the process, and separating the calcium hydroxide from the calcium carbide by the action of a current of an inert gas conducted therethrough with such a speed as to carry away the calcium hydroxide having been detached by the mechanical stirring.

15. A process for the production of acetylene from calcium carbide which comprises adding only so much water to the calcium carbide as is necessary for the production of acetylene and a practically dry calcium hydroxide while simultaneously stirring the mixture of calcium carbide and calcium hydroxide formed during the process, and separating the calcium hydroxide from the calcium carbide by the action of a current of an inert gas conducted therethrough with such a speed as to carry away the calcium hydroxide having been detached by the mechanical stirring, the gas being passed in a circulating stream.

WILLIAM F. MESINGER.